United States Patent [19]

Kakegawa et al.

[11] Patent Number: 5,007,381
[45] Date of Patent: Apr. 16, 1991

[54] METHOD TO DECREASE BLACK SMOKE OF DIESEL

[75] Inventors: Toshiaki Kakegawa, Tsukuba; Shoichi Furuhama, Tokyo, both of Japan

[73] Assignee: Advance Combustion Engineering Institute Co., Ltd., Tsukuba, Japan

[21] Appl. No.: 468,328

[22] Filed: Jan. 22, 1990

[51] Int. Cl.$^5$ .............................................. F02B 75/12
[52] U.S. Cl. ............................ 123/1 A; 123/DIG. 12; 123/3
[58] Field of Search ............. 123/DIG. 12, 3, 27 G E

[56] References Cited

U.S. PATENT DOCUMENTS

| | | | |
|---|---|---|---|
| 4,359,969 | 11/1982 | Mellovist et al. | 123/3 |
| 4,573,435 | 3/1986 | Shelton | 123/DIG. 12 |
| 4,723,303 | 2/1988 | Leonhard | 123/DIG. 12 |
| 4,876,988 | 10/1989 | Paul et al. | 123/27 G E |

Primary Examiner—E. Rollins Cross
Attorney, Agent, or Firm—Armstrong, Nikaido, Marmelstein, Kubovcik & Murray

[57] ABSTRACT

The method by this invention is characterized in that a fuel injection nozzle to inject diesel fuel oil into cylinder and an auxiliary injection nozzle to inject the combustible gas or non-combustible gas into the cylinder are provided, and that said combustible gas or non-combustible gas is injected in the latter stage of the diesel fuel oil combustion. More concretely, a part of the fuel is reformed to combustion gases by a fuel reforming apparatus and the gases are injected, or the combustible gas or non-combustible gas is prepared in another gas cylinder, and this gas is injected in the latter stage of the combustion.

4 Claims, 2 Drawing Sheets

METHOD TO DECREASE BLACK SMOKE OF DIESEL

BACKGROUND OF THE INVENTION

The present invention relates to a method to decrease black smoke of diesel engine by injecting combustible gas or non-combustible gas in the latter stage of diesel engine combustion.

In a diesel engine, it is essential to furnish the air-fuel mixture as completely and quickly as possible and to achieve complete combustion of as much fuel as possible by the air in the combustion chamber in order to convert the fuel energy efficiently into work. However, as far as diesel fuel oil is used as fuel, the unburnt products remain more or less, and these substances are emitted as black smoke.

From the viewpoint to eliminate black smoke, a diesel engine not discharging black smoke has already been attained in a methanol diesel engine using methanol as fuel because methanol is an oxygen-containing substance. However, methanol is not available at the filling stations, and the problems remain with regard to the supply and the cost of methanol.

It is an object of the present invention to decrease black smoke emitted by diesel fuel combustion by injecting the combustible gas or non-combustible gas in the latter stage of diesel fuel combustion.

Another object of this invention is to obtain the oxygen-containing combustible gas by reforming a part of diesel fuel by a fuel reforming apparatus.

Still other objects and advantages of the invention will in part be obvious and will in part be apparent from the specification.

SUMMARY OF THE INVENTION

To attain these objects, the method to decrease black smoke of diesel engine according to this invention is characterized in that a fuel injection nozzle to inject the diesel fuel into cylinder and an auxiliary injection nozzle to inject the combustible gas or non-combustible gas are provided, and that said combustible gas or non-combustable gas is injected in the latter stage of the diesel fuel combustion. More concretely, a part of fuel is reformed to combustible and/or non-combustible gases by a fuel reforming apparatus and these gases are injected into cylinder, or the combustible gas or non-combustible gas is prepared in another gas cylinder and this gas is injected in the latter stage of the combustion.

In diesel engine, carbon is generated when diesel fuel injected from fuel injection nozzle is burnt within the cylinder, because the fuel and the air are not sufficiently mixed together. Whereas, according to this invention, in the latter stage of the diesel fuel combustion, the combustible gas containing preferably oxygen or non-combustible gas consisting preferably of a large molecular weight is injected from the auxiliary injection nozzle into the cylinder, and the mixing of the fuel with the air is further accelerated within the cylinder by the explosion energy or the kinetic energy induced by gas injection, which accelerate reburning of carbon generated at the former stage of the diesel fuel combustion.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
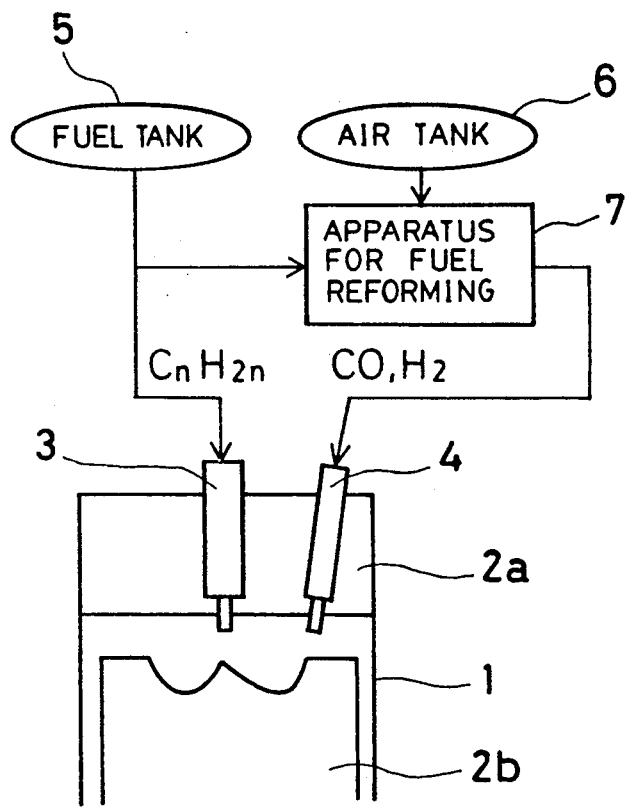
FIG. 1 is a schematical drawing of an embodiment of the method to decrease black smoke of diesel engine according to the present invention.

In the following, the embodiment of the present invention will be described in connection with the drawings. In the drawings, 1 refers to a cylinder of an engine, 2a a cylinder head, 2b a piston, 3a fuel injection nozzle, 4 an auxiliary injection nozzle, 5 a fuel tank, 6 an air tank, and 7 a fuel reforming apparatus.

On the cylinder head 2 of the engine, a diesel fuel injection nozzle 3 and an auxiliary injection nozzle 4 are provided, and the fuel from a fuel tank 5 is injected from a fuel injection nozzle 3 into the cylinder 1. A part of the fuel from the fuel tank 5 and the air tank in the air tank 6 are sent to the fuel reforming apparatus 7, where the fuel is partially oxidized. The reformed gas mixture is injected from said auxiliary injection nozzle 4 into the cylinder 1 in the latter stage of the diesel fuel combustion.

In the fuel reforming device 7 as described above, diesel fuel is decomposed by partial oxidation reaction using a nickel catalyst. The reaction formula is as follows:

$$C_nH_{2n} + (n/2) O_2 \rightarrow nCO + nH_2$$

The combustible gases consisting of the carbon monoxide and the hydrogen thus generated are injected from the auxiliary injection nozzle 4 into the cylinder 1.

Figure 2:
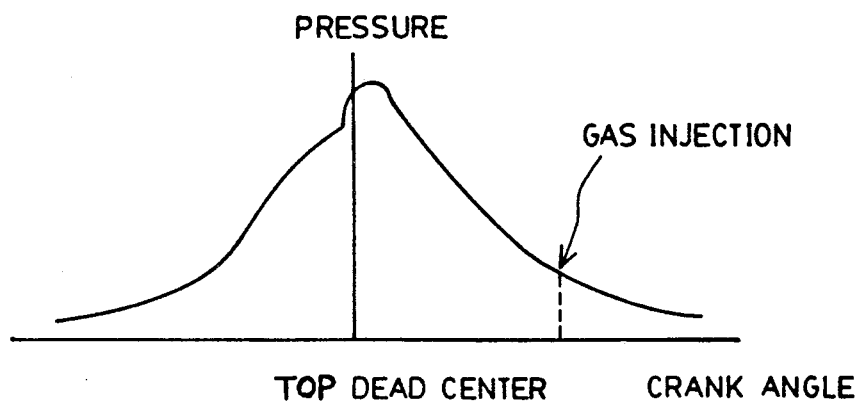
FIG. 2. is a diagram to explain the principle of the method according to this invention.

FIG. 2 shows the condition of the combustion in the cylinder. When the diesel fuel injected from the fuel injection nozzle 3 is burnt in the cylinder, carbon is generated because the fuel and the air are not sufficiently mixed. In this embodiment, the combustible gas is injected from the auxiliary injection nozzle 4 into the cylinder 1 in the latter stage of the combustion. The mixing of the fuel with the air in the cylinder is further accelerated by the energy of the explosion induced by combustible gas combustion, and black smoke is decreased.

The present invention is naturally not limited to the above embodiment, and various modifications and variations can be conceived. For example, the quality of a part of the fuel may be improved to the combustible gas by a fuel reforming apparatus, or the combustible gas consisting of hydrogen or carbon monoxide may be prepared in another gas cylinder, and this gas may be injected in the latter stage of the combustion.

Or, the non-combustible gas such as oxygen ($O_2$), helium (He), nitrogen ($N_2$), argon (Ar), etc. may be injected in the latter stage of the combustion.

Figure 3:
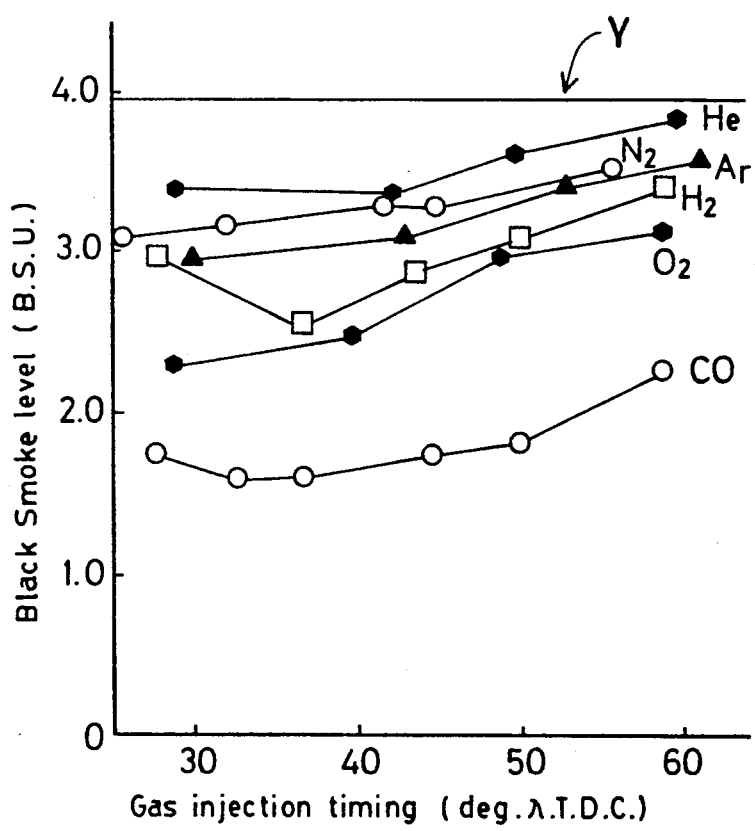
FIG. 3 is a diagram showing the results of the experiment, in which black smoke is decreased when each of the gases is injected.

FIG. 3 shows how black smoke is decreased when the above 2 types of combustible gas or 4 types of non-combustible gas are injected. In the figure, the line Y represents the level of black smoke when gas is not injected.

Further, the gas injection may be controlled in such manner that gas is injected only when the engine is operated in high load condition.

What is claimed is:

1. A method for decreasing black smoke of an operating diesel engine, characterized in that a fuel injection nozzle to inject the fuel into a combustion chamber in a cylinder of the diesel engine and an auxiliary injection nozzle to inject combustible gas or non-combustible gas into the combustion chamber of the cylinder are provided, and that said combustible gas or non-combustible gas is injected into the cylinder in the latter stage of combustion.

2. A method for decreasing black smoke of diesel engine as set forth in claim 1, wherein a portion of the fuel is reformed by a fuel reforming apparatus to produce a reformed combustible gas and the reformed combustible gas is injected in the latter stage of the combustion.

3. A method for decreasing black smoke of diesel engine as set forth in claim 1, wherein said combustible gas is selected from the group consisting of hydrogen, carbon monoxide and a mixtures thereof.

4. A method for decreasing black smoke of diesel engine as set forth in claim 1, wherein said non-combustible gas is selected from the group consisting of oxygen, helium, nitrogen and argon.

* * * * *

UNITED STATES PATENT AND TRADEMARK OFFICE
CERTIFICATE OF CORRECTION

PATENT NO. : 5,007,381

DATED : April 16, 1991

INVENTOR(S) : Toshiaki KAKEGAWA et al

It is certified that error appears in the above-identified patent and that said Letters Patent is hereby corrected as shown below:

On the title page, Item [54], second line, after "DIESEL", insert -- ENGINE --.

On the title page, Item [73], "Advance" should read -- Advanced --.

Signed and Sealed this

Sixth Day of October, 1992

Attest:

DOUGLAS B. COMER

*Attesting Officer*   *Acting Commissioner of Patents and Trademarks*